INVENTOR.
Edwin R. Wilson.

ATTORNEY.

UNITED STATES PATENT OFFICE.

EDWIN R. WILSON, OF SYKES, MONTANA.

WINDMILL.

1,417,438.  Specification of Letters Patent.  Patented May 23, 1922.

Application filed September 29, 1920. Serial No. 413,463.

*To all whom it may concern:*

Be it known that I, EDWIN R. WILSON, a citizen of the United States, residing at Sykes, in the county of Fallon and State of Montana, have invented certain new and useful Improvements in Windmills; and I do hereby declare the following to be a full, clear, and exact description of the invention, such as will enable others skilled in the art to which it appertains to make and use the same.

The object of the invention is to provide a comparatively simple and efficient wind mill construction which is adapted not only for the operation of pumps but may be used in driving farm machinery such as grindstones, threshers, feed cutters and the like and which with the minimum of attention is adapted for operation regardless of the direction of movement of the wind whether the parts are arranged stationary or upon a revoluble support as in the most common forms of devices of this class; and with these objects in view the invention consists in a construction and combination of parts of which a preferred embodiment is shown in the accompanying drawings, wherein;

Figure 1:
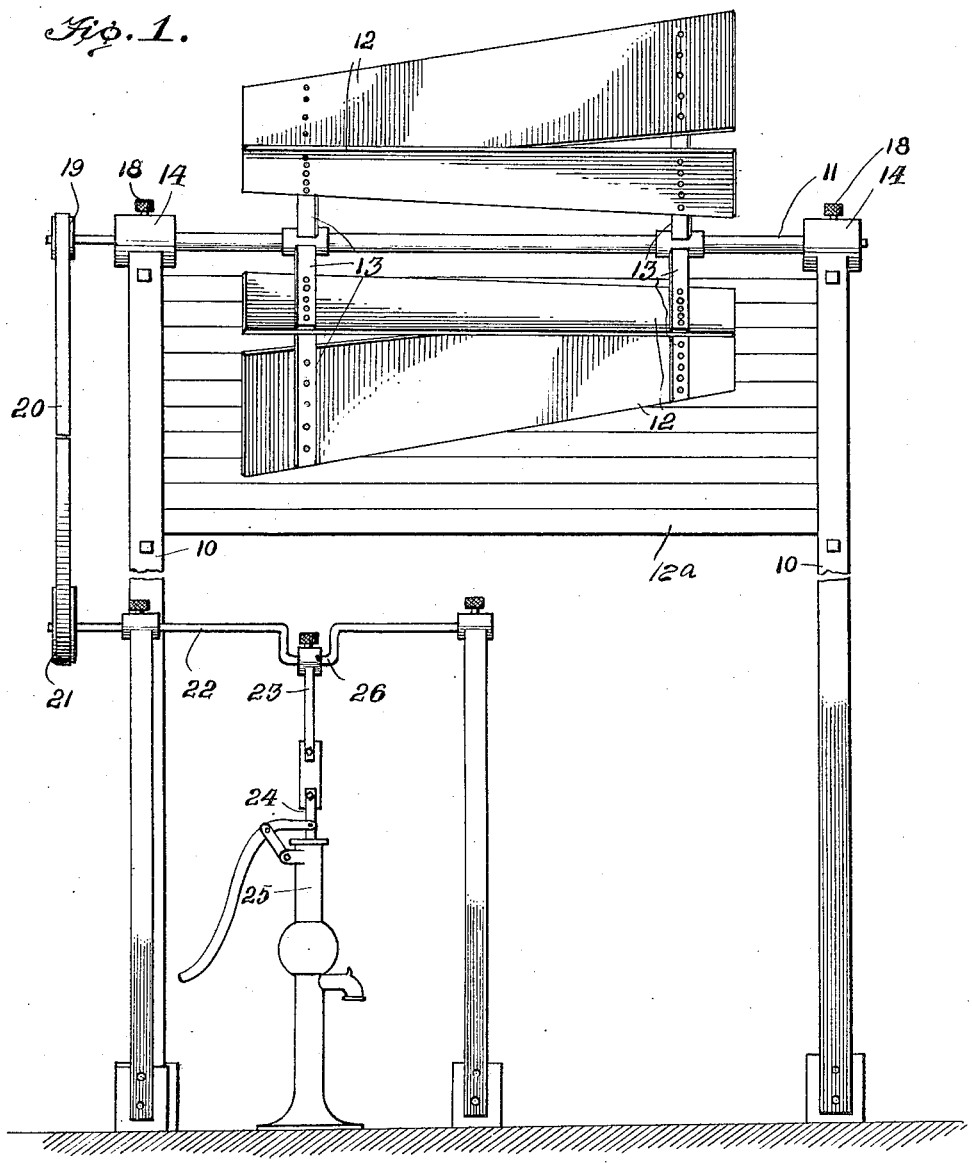
Figure 1 is a side view of a windmill construction embodying the invention applied in the operative position for actuation of a pump.
Figure 2:
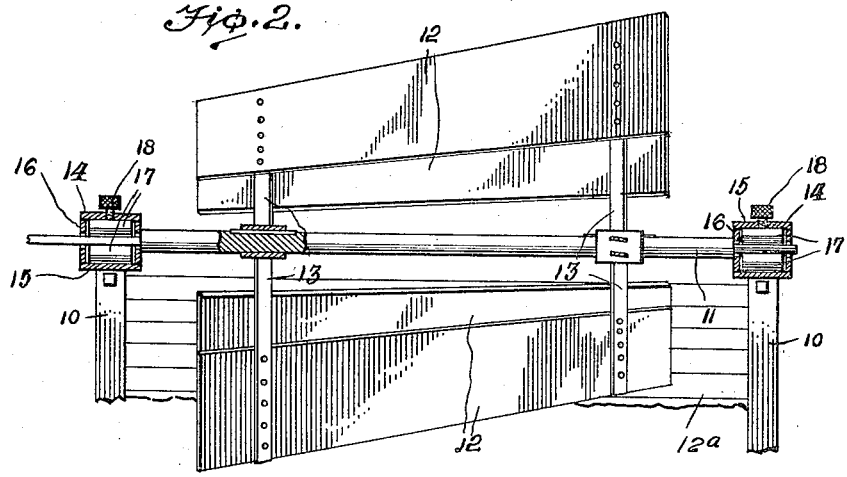
Figure 2 is a sectional view taken longitudinally of the wind mill structure.
Figure 3:
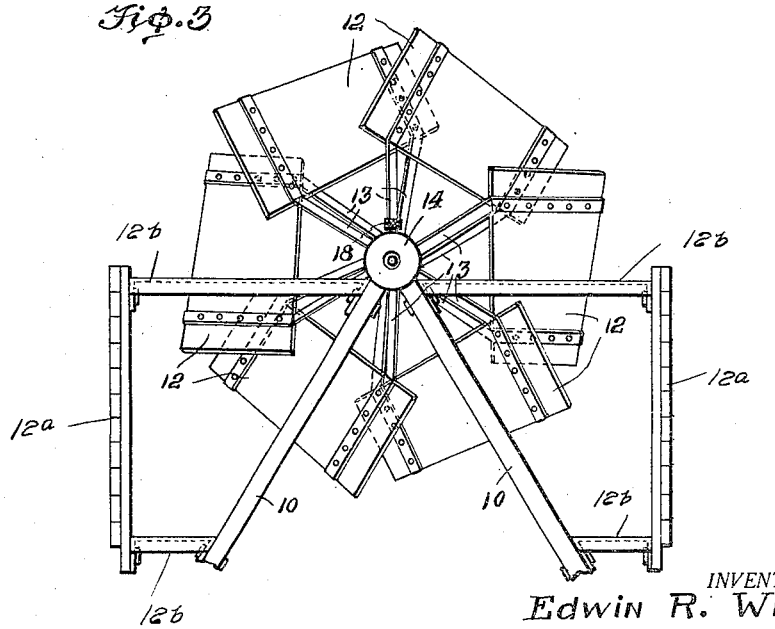
Figure 3 is an end view of the same.

Upon a supporting frame work having the uprights 10 there is mounted a wind wheel which comprises a substantially horizontal shaft 11 and blades 12, which are secured to the shaft by spokes 13. Any desired number of blades may be employed, satisfactory results having been secured by the use of either four or six blades. A vertical wind shield 12ª is located at each side of the wind wheel to prevent side winds from acting upon the lower half thereof. The blades are disposed spirally or in oblique relation to the shaft so that the faces thereof present glancing surfaces to the pressure of the wind approaching the same in any direction. The arrangement of the blades together with the wind shields, adapts the wheel to rotate under the influence of wind approaching from any direction whether or not the bearings 14 in which the shaft 11 is mounted are arranged in a stationary position or are adapted as in the ordinary practice to provide for the positioning of the wheel to suit the direction of movement of the air. The wind shields 12ª are secured to the frame uprights 10 by arms 12ᵇ.

In the construction illustrated the bearings 14 which are supported by the standards 10 include sleeves 15 in which are arranged heads 16 with interposed anti-friction rollers 17, a suitable lubricating device such as a grease cup or hard oil container 18 being arranged upon each bearing box.

In the construction illustrated the shaft 11 is provided with a belt wheel 19 connected by a belt 20 with a similar belt wheel or pulley 21 attached to and carried by a crank shaft 22 with which, by means of a link or pitman 23 the operating rod 24 of a pump 25 may be connected, said shaft 22 having a suitable crank 26, and it being obvious that the shaft may also have means in connection therewith by which motion may be communicated to other machinery to be operated. Obviously, the wind mill may be arranged to one side of the pump instead of directly over it as shown in the drawings.

Having thus described the invention, what I claim is:—

1. A windmill having angularly disposed standards wider apart at their bases than at their upper ends, bearings each mounted by a pair of said standards at their upper ends, a wind wheel having a shaft journaled in said bearings, arms extending outwardly from said standards adjacent to the bearings, arms shorter than and spaced from said arms extending outwardly from said standards, and shields mounted below said shaft by the first and second mentioned arms to prevent undue impingement of the air against said wheel below its axis.

2. A windmill having angularly disposed standards wider apart at their bases than at their upper ends, bearings, mounted by said standards at their upper ends, a rotary wind mill provided with a shaft having reduced portions, the main portion of the shaft being disposed intermediate the bearings and said reduced portions being journaled therein, arms extending outwardly from said standards adjacent to the bearings, arms shorter than and spaced from said arms extending outwardly from said standards, and shields mounted below said shaft by the first and second mentioned arms to prevent undue impingement of the air against said wheel below its axis.

In testimony whereof I affix my signature in presence of two witnesses.

EDWIN R. WILSON.

Witnesses:
 J. D. GROSS,
 D. G. STANEK.